United States Patent Office 2,768,020
Patented Oct. 23, 1956

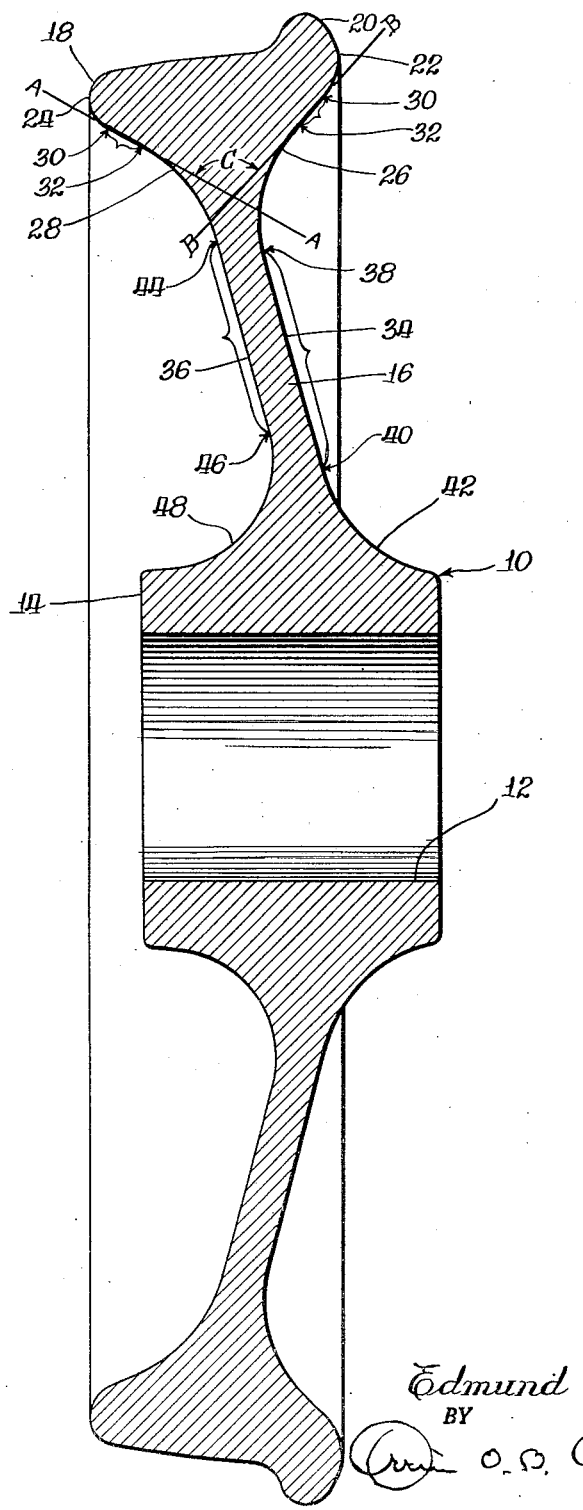

2,768,020
CAST STEEL WHEEL

Edmund Q. Sylvester, Chicago, Ill., assignor to Griffin Wheel Company, Chicago, Ill., a corporation of Delaware Application April 9, 1953, Serial No. 347,682

5 Claims. (Cl. 295—27)

My invention relates to wheels utilized as rolling support for railroad cars and more particularly to a cast steel wheel of novel form and having novel operational characteristics.

For many years the railway industry has been confronted with the problem of producing an economical wheel that would give long service life without failure. The industry has produced various wheels in an attempt to solve this problem, among them having been the chilled iron wheel, the wrought steel wheel and the spun steel wheel. None of these products, though commercially feasible, are considered by those familiar with the art to be the ultimate solution to the wheel problem. This is evidenced by the fact that the wheel problem is still considered current especially in view of the trend to increased railway speeds, increased wheel loading and consequent severe braking conditions.

The problem essentially is to produce a wheel having low initial cost, high strength to carry increased loads, high resistance to thermal checking and cracking including low as-cast internal stresses, and having a hard rim to give long life and wear in operation with a minimum of servicing. A wheel of this nature would be able to withstand severe braking conditions without failure or without the necessity of prematurely scrapping said wheel due to the impending possibility of failure.

In this connection it is well known in the art that the wheels currently utilized have a pronounced affinity for thermal checking or cracking when subjected to the severe braking loads common in railway operation today. The reason assigned is that the heat generated by brake shoe application to the tread surface of the wheel causes the wheel rim temperature, and particularly the tread surface temperature of said rim, to raise beyond a critical point, whereupon cooling of the rim tensional stresses are set up in the tread surface which produce small hairline cracks usually directed transversely of the wheel. These small cracks are known as thermal checks. Thermal checks alone are not sufficient reason to scrap a wheel, however, continued brake application and rim heating causes the checks to develop rapidly into thermal cracks, that is, definite ruptures of the tread surface usually directed transversely of the wheel. A ruptured wheel, of course, must be scrapped. In this connection residual stresses within the wheel in the as-cast condition become important. If said residual stresses are high, they effectively aid the formation of thermal cracks during rim heating. The problem therefore is twofold involving both increased dissipation of heat from the wheel rim during braking application and the reduction of residual stresses in the as-cast condition of the wheel.

In the course of my studies of the current railroad wheel problem I have discovered that a cast steel wheel of the design disclosed shows under actual test strikingly improved operational characteristics over wheels heretofore employed. In addition, the wheel disclosed offers an extremely low production cost such as to be more than competitive with the less desirable wheels currently in use.

I have also discovered that cast steel wheels frequently are subject to higher residual stresses than the chilled iron or wrought steel wheels and that this increased residual stress is due to mold interference with wheel shrinking during the cooling operation after pouring of the wheel.

Accordingly, it is a general object of my invention to devise a cast steel wheel of such construction as to afford improved operational characteristics coupled with a relatively low initial cost.

It is a further object of my invention to devise a railway wheel which will offer long and satisfactory operational life.

It is another object of my invention to provide a cast steel wheel of such contour and form as will substantially hinder the formation of residual stresses in said wheel in the as-cast condition.

It is a more specific object of my invention to devise a wheel of such form as to present increased plate and fillet construction at the hub and rim.

It is a further specific object of my invention to provide a wheel of the type described with increased capacity to dissipate heat generated in the rim of said wheel.

It is another specific object of my invention to provide a wheel of such form and contour as to afford increased strength without material increased size thereby accommodating high wheel load capacity.

These and other objects of my invention will become apparent in the course of the following description and from an examination of the concerned drawing, wherein the figure is a central vertical sectional view of a railway wheel embodying the features of my invention.

Describing my invention in detail, a wheel indicated generally at 10 presents centrally thereof a transverse bore 12 which is operative to receive an axle (not shown) to which the wheel is conventionally attached. A hub portion 14 is centrally located on the wheel and surrounds the bore 12. Integrally formed with the hub portion and extending substantially radially from the periphery of said portion is the plate 16. A rim 18 is peripherally formed on the radially outward edge of the plate 16, said rim comprising a flange 20 formed on the inboard side of the wheel and extending radially and peripherally from the outer wheel tread surface of the rim 18.

Attention is now directed to the cross sectional contour of applicant's disclosed wheel and particularly to the fillet construction and both the hub and rim. It will be noted that the outboard and inboard edges of the rim 18 are smoothly contoured so as to be tangent to planes substantially parallel to the general plane of the wheel. This inboard and outboard tangency is indicated at 22 on the inboard wheel side and 24 at the outboard wheel side. The rim edge contours also blend smoothly with relative long sweeping inboard and outboard rim fillets 26 and 28, respectively, which in turn blend smoothly with the wheel plate 16. It should be noted that the respective cross sectional convex rim edges and the associated concave fillet surfaces are interconnected at each side of the wheel by inboard and outboard flat surfaced or straight line segments as indicated by the numerals 30 and 32, the inboard segment extending inboardly at an angle of approximately 45 degrees from the axis of the wheel. In order to more particularly define the disclosed rim fillet construction, it will be seen that the lines B—B and A—A are drawn tangent to the respective inboard and outboard fillet curves in such manner as to produce the maximum angular spacing between said lines at their point of intersection, said maximum angle being indicated by C. Specifically, my invention contemplates an angular relation of approximately 106 degrees, or in any event, said angular relation must not exceed 110 degrees.

Directing attention to the plate 16, it will be seen that said plate is defined by inboard and outboard flat substantially parallel surfaces 34 and 36, respectively. It will also be noted that the inboard surface 34, in cross section, defines a straight line beginning at point 38 whereat merger with the fillet 26 commences and extending to point 40 whereat merger with the inboard hub fillet 42 commences. In cross section the outboard surface 36 also defines a straight line beginning at point 44 whereat merger with the fillet 28 commences and extending to point 46 whereat merger with the outboard hub fillet 48 commences.

It will be noted that the hub fillets 42 and 48 blend smoothly with the plate 16 and that both the hub and rim fillets are formed integrally with said plate and without sharp break in their respective curvatures, each of said hub fillets being struck on an arc of constant radius from the point of blend with the hub to the point of blend with the plate.

As noted above, I have discovered that a cast steel wheel of the form and contour as herein disclosed offers high operational resistance to thermal checking and cracking under severe loading and braking conditions and that said steel wheel is extremely economical in original cost.

It is believed that the rim fillet construction above described increases heat dissipation from the rim of the wheel, said heat being conducted to the plate and then to the atmosphere by reason of the fact that said construction offers smooth heat conductive paths.

I have discovered that the freedom of said wheel from residual stresses is due to the fact that the sweeping fillet construction at both the rim and hub accommodates contraction of the wheel while cooling in the mold without substantial interference therewith. In short, the smooth sweeping fillet construction allows the wheel to contract normally by raising itself on the mold in an inclined plane fashion.

I claim:

1. In a cast steel railway wheel having a relatively high resistance to thermal checking and cracking when subjected to severe braking conditions, a hub having an axial bore, a plate portion having flat parallel surfaces angularly related to the general plane of the wheel, said plate portion being joined to said hub portion approximately medially of the latter, arcuate hub fillet surfaces merging with said flat parallel surfaces, a rim having inboard and outboard arcuate edges, radially diverging inboard and outboard flat areas on said rim merging with their respective arcuate edges, said inboard flat area extending inboardly at an angle of approximately 45 degrees from the axis of the wheel, rim fillets provided between the rim and said plate portion, said rim fillets having arcuate surfaces merging smoothly with their respective flat areas and the flat surfaces of the plate portion, said flat areas being so disposed that planes projected therefrom have an included angle of approximately 106 degrees and intersect approximately centrally between planes projected radially from said flat surfaces.

2. In a cast steel railway wheel having a relatively high resistance to thermal checking and cracking when subjected to severe braking conditions, a hub, a plate portion projecting radially from said hub and having flat inboard and outboard surfaces, a rim on said plate portion, said plate portion and hub being connected by fillets, said rim having flat inboard and outboard areas on opposite sides of said plate portion, fillets having arcuate surfaces merging with said flat areas and the flat surfaces of said plate portion, said flat areas being so disposed that planes projected therefrom define an included angle of approximately 106 degrees and not more than 110 degrees and intersect approximately centrally between planes projected radially from the flat surfaces of said plate portion, said inboard flat area extending inboardly at an angle of approximately 45 degrees from the axis of the wheel.

3. A cast steel railway wheel according to claim 2, wherein the plate portion presents inboard and outboard flat parallel surfaces, said surfaces being in acute angle relation to the general plane of the wheel.

4. In a cast steel railway wheel having a relatively high resistance to thermal checking and cracking when subjected to severe braking conditions, a hub and rim interconnected by a plate having flat parallel inboard and outboard surfaces, said plate joining said rim approximately centrally of the latter, flat inboard and outboard areas on said rim on opposite sides of said plate, rim fillets having arcuate surfaces merging with said flat areas and said flat surfaces, said flat areas being disposed so that planes projected therefrom have an included angle of approximately 106 degrees and intersect centrally between planes projected radially from said flat surfaces, said inboard flat area extending inboardly at an angle of approximately 45 degrees from the axis of the wheel.

5. A cast steel railway wheel according to claim 4, wherein said rim fillet surfaces have radii of approximately three times the thickness of said plate.

References Cited in the file of this patent

UNITED STATES PATENTS

| | | |
|---|---|---|
| 159,530 | Tarr | Feb. 9, 1875 |
| 856,675 | Blair | June 11, 1907 |
| 1,316,087 | Dowe | Sept. 16, 1919 |
| 1,593,856 | Thomson | July 27, 1926 |
| 1,728,641 | Trant | Sept. 17, 1929 |
| 2,382,550 | Eksergian | Aug. 14, 1945 |